United States Patent
Cunha et al.

(10) Patent No.: US 10,508,700 B2
(45) Date of Patent: Dec. 17, 2019

(54) HIGH FATIGUE ARCUATE SPRING

(71) Applicant: Barnes Group Inc., Bristol, CT (US)

(72) Inventors: Eugenio Ferreira Cunha, Sao Paulo (BR); Sergio Roveri, Sao Paulo (BR)

(73) Assignee: Barnes Group Inc., Bristol, CT (US)

( * ) Notice: Subject to any disclaimer, the term of this patent is extended or adjusted under 35 U.S.C. 154(b) by 0 days.

(21) Appl. No.: 13/935,795

(22) Filed: Jul. 5, 2013

(65) Prior Publication Data

US 2014/0015179 A1    Jan. 16, 2014

Related U.S. Application Data

(60) Provisional application No. 61/668,658, filed on Jul. 6, 2012.

(51) Int. Cl.
| | | |
|---|---|---|
| *F16F 1/04* | (2006.01) | |
| *F16F 1/12* | (2006.01) | |
| *F16F 15/123* | (2006.01) | |
| *B21F 35/00* | (2006.01) | |

(52) U.S. Cl.
CPC ............... *F16F 1/04* (2013.01); *F16F 1/125* (2013.01); *F16F 15/12326* (2013.01); *B21F 35/00* (2013.01); *F16F 15/12333* (2013.01); *Y10T 29/49609* (2015.01)

(58) Field of Classification Search
CPC ...... F16F 1/04; F16F 1/06; F16F 1/065; F16F 1/028; F16F 1/125; F16F 1/12; F16F 1/128; F16F 15/12326; F16F 15/12333
USPC ....... 267/166, 167, 180, 155, 170, 178, 179; 29/896.9, 896.91, 896.93
See application file for complete search history.

(56) References Cited

U.S. PATENT DOCUMENTS

| | | | | |
|---|---|---|---|---|
| 2,466,094 A | * | 4/1949 | Frost, Jr. | B61F 5/12 |
| | | | | 267/204 |
| 4,193,824 A | | 3/1980 | Egorov et al. | |
| 4,362,287 A | * | 12/1982 | Grongstad | B63B 29/12 |
| | | | | 248/563 |
| 4,857,032 A | * | 8/1989 | Aiki | F16F 15/13446 |
| | | | | 464/68.92 |
| 4,891,033 A | * | 1/1990 | Heyser | F16F 15/1234 |
| | | | | 192/205 |

(Continued)

FOREIGN PATENT DOCUMENTS

| | | |
|---|---|---|
| CN | 2091991 | 1/1991 |
| CN | 1495372 | 5/2004 |

(Continued)

OTHER PUBLICATIONS

Tschaetsch, Heinz, "Metal Forming Practice", 2006, Springer-Verlag Berlin Heidelberg, Chapter 16 Bending, p. 194-210.*

(Continued)

Primary Examiner — Thomas J Williams
(74) Attorney, Agent, or Firm — Fay Sharpe LLP

(57) ABSTRACT

An arcuate spring having a plurality of coils which are configured and dimensioned to provide an arcuate shape to the spring and being substantially free of internal stresses which would tend to urge the coils into linear alignment. The spring is designed to function under load conditions while maintaining its natural arcuate shape. The spring is can be heated by use of an induction heating process.

14 Claims, 6 Drawing Sheets

(56) References Cited

U.S. PATENT DOCUMENTS

| | | | | |
|---|---|---|---|---|
| 4,959,039 | A | * | 9/1990 | Naudin ............. F16F 15/12333 192/205 |
| 5,052,664 | A | * | 10/1991 | Lesher et al. ................. 267/167 |
| 5,092,820 | A | * | 3/1992 | Naudin ............. F16F 15/12333 192/205 |
| 5,868,996 | A | | 2/1999 | Vondracek et al. |
| 5,971,857 | A | | 10/1999 | Friedmann |
| 6,041,905 | A | * | 3/2000 | Fujimoto ................ F16F 1/125 192/205 |
| 6,461,243 | B1 | * | 10/2002 | Uehara ............ F16F 15/12326 192/205 |
| 6,547,227 | B1 | * | 4/2003 | Mende .......................... 267/168 |
| 6,645,079 | B2 | * | 11/2003 | Yoshimura ................ 464/68.92 |
| 2002/0104665 | A1 | | 8/2002 | Wolf et al. |
| 2013/0119045 | A1 | * | 5/2013 | Hirata et al. ................. 219/221 |

FOREIGN PATENT DOCUMENTS

| | | |
|---|---|---|
| CN | 101184934 | 5/2008 |
| CN | 102424908 | 4/2012 |
| DE | 102009022440 | 11/2010 |
| EP | 0584474 | 3/1994 |
| JP | 2000129359 | 9/2000 |
| JP | 2007268573 | 10/2007 |

OTHER PUBLICATIONS

U.S. Search Authority, International Search Report and Written Opinion, dated Dec. 13, 2013, for corresponding patent application PCT/US2013/049439.

European Patent Office; Supplemental Partial European Search Report for related application No. EP13813068 (May 13, 2016).

\* cited by examiner

HIGH FATIGUE ARCUATE SPRING

The present invention claims priority on U.S. Provisional Application Ser. No. 61/668,658 filed Jul. 6, 2012, which is incorporated herein.

The present invention is directed to an improved arcuate spring and a method for forming an arcuate spring.

BACKGROUND OF THE INVENTION

Vibration in a vehicle drive train has been a long-standing problem, and a torsional vibration damper assembly is desirable to neutralize any torsional vibrations emanating from the vehicle engine which could result in undesirable impact loads, vibration, noise, etc.

Torsional vibration damper assemblies have usually comprised straight resilient means, such as coil springs, which were forcibly bowed through the use of clips, wedges, spring separators or dividers, or the like to obtain the desired arcuate shape. In addition, a plurality of shorter straight springs were sometimes substituted for the longer bowed springs along the path that would have been occupied by the longer bowed springs. Such configurations, however, were complicated, requiring a plurality of precise parts to complete the assembly. Thus, such assemblies were difficult to manufacture, maintain and operate, which translates into a higher product cost.

To address this past problem, an arcuate spring was developed as disclosed in U.S. Pat. No. 5,052,664, which is incorporated herein. The '664 patent discloses the use of an arc opening process to form the arcuate spring. The arc opening process is critical step of the standard arcuate spring manufacturing process; however, such arc opening process is very time consuming.

In view of the current state of the art for the formation of arcuate springs, there is a need for an improved process for forming arcuate springs, arcuate springs having improved performance, and a process for lowering the manufacturing cost of the arcuate spring.

SUMMARY OF THE INVENTION

The present invention is directed to an arcuate spring and method for manufacturing the arcuate spring that addresses the current needs as set forth above.

The present invention is an improved manufacturing process for forming a spring wherein all or a portion of the spring has an arcuate shape (e.g., arc shaped, S-shaped, U-shaped, C-shaped, etc.). As can be appreciated, the various shapes of the spring that can be formed by the present invention are non-limiting. All these springs that include at least an arcuate portion will be hereinafter reference to as "arcuate springs". The improved process eliminates the arc opening process and instead uses an induction hardening process to form the arc in the spring. The arcuate spring of the present invention is generally a helically-shaped spring formed of a plurality of coils which are configured and dimensioned to provide an arcuate shape to the spring in its free or natural state. As can be appreciated, the spring can have a shape other than a helical shape. The coils of the arcuate spring are generally free of internal stresses which would tend to urge the coils into linear alignment. The arcuate spring is generally designed to have a strength that is sufficient to resiliently absorb and/or release forces in either arcuate direction along an arcuate path.

In one non-limiting embodiment of the invention, the arcuate spring is made of a hardenable or hardened steel. As can be appreciated, the arcuate spring can be formed of other materials. Generally, the material used to form the arcuate portion of the spring is a material that can be inductively heated. The arcuate spring is generally designed to be capable of achieving a Rockwell C hardness of at least about 20 and up to about 80, and typically between about 40 and 60; however, this is not required. The arcuate spring generally has a tensile strength of at least 90,000 psi, typically at least about 100,000 psi, and more typically at least about 190,000 psi; however, this is not required. The size, shape and length of the arcuate spring are non-limiting. The cross-section shape and size of the coils of the spring are non-limiting. The arc radius of the spring is non-limiting.

In another and/or alternative non-limiting embodiment of the invention, there is provided a method for making an arcuate spring by initially forming a straight spring; prestressing the spring to an arcuate shape; heat treating the spring by induction heating at elevated temperatures for a sufficient time to relieve stresses in the spring and to form an arcuate spring; and then cooling the arcuate spring to lower (e.g., ambient) temperatures. The spring is generally prestressed by use of a fixture. The type of fixture is non-limiting. The spring can be heat treated subsequent to being prestressed by the fixture and/or heated prior to being prestressed by the fixture. Generally, the spring is heated subsequent to being prestressed by the fixture. The heat treating step generally includes heating one or more portions of the spring by an induction heating process. Optionally, additional types of heat treating processes can be used to heat one or more portions of the spring. The heat treating step includes a step of cooling the spring. In one non-limiting arrangement, the cooling step includes quenching the spring into a fluid (e.g., air, gas, liquid, etc.). In one non-limiting example, the quench fluid is a liquid (e.g., water, oil, water and oil mixture, etc.). In another non-limiting example, the quench fluid is a gas (e.g., nitrogen argon, air, etc.). The spring during the cooling process is generally rapidly cooled (e.g., cooled within 0.01-5 minutes, etc.) by the quench fluid to a temperature that is generally from +150° F. to −50° F. of the ambient temperature (e.g., 60-90° F.). In one non-limiting example, the spring during the cooling process is rapidly cooled (e.g., cooled within 0.01-2 minutes) by the quench fluid to a temperature that is generally about ±30° F. of the ambient temperature (e.g., 60-90° F.). Generally the spring is released from the fixture after and/or during the quenching step.

As mentioned above, the present invention is an improvement over prior art methods for forming an arcuate spring. Current prior art processes for forming an arcuate spring involve the steps of:
1. Coiling the wire to form a straight helical spring;
2. Stress relieving the formed straight helical spring;
3. Shot peening straight helical spring;
4. Grinding the ends of the straight helical spring;
5. Shot peening the straight helical spring a second time;
6. Pre-heating the straight helical spring;
7. Bending the helical spring in a fixture;
8. Heating the bent helical spring in an oven for over 20 minutes while in the fixture;
9. Quenching the heated helical spring; and,
10. Removing the quenched helical spring from the fixture.

The present invention is a significant improvement over the prior art process for forming an arcuate spring. The process of the present invention involves the steps of:

a. Coiling the wire to form a straight spring;

b. Heating the spring by induction heating prior to bending the spring in a fixture;

b. Bending the heated spring in the fixture;

d. Quenching the heated spring; and, e. Removing the quenched spring from the fixture.

The forming process in accordance with the present invention is fundamentally different from prior arcuate spring forming processes in that the spring is first heated by induction heating prior to the spring being placed in a fixture. As can be appreciated, the spring could be placed in a fixture prior to and during heating. When the spring is inductively heated, the spring is generally heated while the spring is a straight spring. The induction heating of the spring generally takes less than about 5 minutes, typically less than about 2 minutes, more typically less than about 1 minute, and yet more typically less than about 30 seconds; however, other time periods can be used. The heating time using an induction heating process is significantly less than convention heating time period that occurred in an oven, which prior heating times were in excess of 10 minutes, and typically at least 20 minutes. After the spring is inductively heated when in a straight shape, the heated straight spring is generally formed in the fixture into an arcuate shape in less than about 5 minutes after being inductively heated, typically less than about 2 minutes after being inductively heated, more typically less than about 1 minute after being inductively heated, and yet more typically less than about 30 seconds after being inductively heated; however, other time periods can be used. The spring that was heated and hardened by the process in accordance with the present invention exhibited improved residual stress rates as compared to springs that were heated in a traditional heating oven.

One or more additional process steps can be used for form the arcuate spring of the present invention. Such optional additional steps include:

i. Stress relieving the formed spring prior and/or after induction heating.

ii. Shot peening the spring one or more times prior and/or after induction heating.

iii. Pre-heating the spring prior to induction heating.

iv. Grinding the ends of the spring prior and/or after induction heating.

v. Attaching an end cap to one or more ends of spring with or without the grinding of the ends of the spring.

One non-limiting object of the present invention is to provide an improved process for forming arcuate springs.

Another and/or alternative non-limiting object of the present invention is to provide an improved process for forming arcuate springs that have improved performance.

Still another and/or alternative non-limiting object of the present invention is to provide an improved process for forming arcuate springs that lowers the manufacturing cost of the arcuate springs.

Yet another and/or alternative non-limiting object of the present invention is to provide an improved process for forming arcuate springs that reduce risk of inclusion failures with better residual stress profile induced by the induction heat treatment.

Still yet another and/or alternative non-limiting object of the present invention is to provide an improved process for forming arcuate springs that increase material hardness, generating a high fatigue arcuate spring (i.e., improved fatigue properties).

Another and/or alternative non-limiting object of the present invention is to provide an improved process for forming arcuate springs that can also generate unique spring shapes (e.g., S-shapes, C-shapes, U-shapes, etc.).

Still another and/or alternative non-limiting object of the present invention is to provide an improved process for forming arcuate springs that have improved mechanical properties.

Yet another and/or alternative non-limiting object of the present invention is to provide an improved process for forming arcuate springs that reduces the time for forming the arcuate springs.

Still yet another and/or alternative non-limiting object of the present invention is to provide an improved process for forming arcuate springs that uses induction heating to form the arcuate springs.

Another and/or alternative non-limiting object of the present invention is to provide an improved process for forming arcuate springs that uses end caps on one or more ends of the spring so as to eliminate or reduce the need to grind one or both ends of the arcuate springs.

Still another and/or alternative non-limiting object of the present invention is to provide an improved process for forming arcuate springs that includes the steps of a) coiling the wire to form a straight spring; b) heating the spring by induction heating; c) bending the heated spring in a fixture; d) quenching the heated spring; and, e) removing the quenched spring from the fixture.

Yet another and/or alternative non-limiting object of the present invention is to provide an improved process for forming arcuate springs that includes one or more additional/optional process steps that include i) stress relieving the formed spring prior and/or after induction heating; ii) shot peening the spring one or more times prior and/or after induction heating; iii) pre-heating the spring prior to induction heating; iv) grinding the ends of the spring prior and/or after induction heating; and/or v) attaching an end cap to one or more ends of spring with or without the grinding of the ends of the spring.

Still yet another and/or alternative non-limiting object of the present invention is to provide an arcuate spring having a plurality of coils which are configured and dimensioned to provide an arcuate shape to the spring and being substantially free of internal stresses which would tend to urge the coils into linear alignment.

Another and/or alternative non-limiting object of the present invention is to provide an arcuate spring having a plurality of coils which are configured and dimensioned to provide an arcuate shape to the spring and having an end cap connected to one or more ends of the spring with or without the grinding of the ends of the spring.

Still another and/or alternative non-limiting object of the present invention is to provide an arcuate spring that may or may be formed by the use of induction heat treatment.

Yet another and/or alternative non-limiting object of the present invention is to provide an arcuate spring having increased fatigue life and better material properties due to induction heat treatment.

These and other objects and advantages will become apparent to those skilled in the art upon the reading and following of this description taken together with the accompanying drawings.

BRIEF DESCRIPTION OF THE DRAWINGS

Reference may now be made to the drawings, which illustrates non-limiting embodiments of the present invention.

DESCRIPTION OF NON-LIMITING EMBODIMENTS

Figure 1:
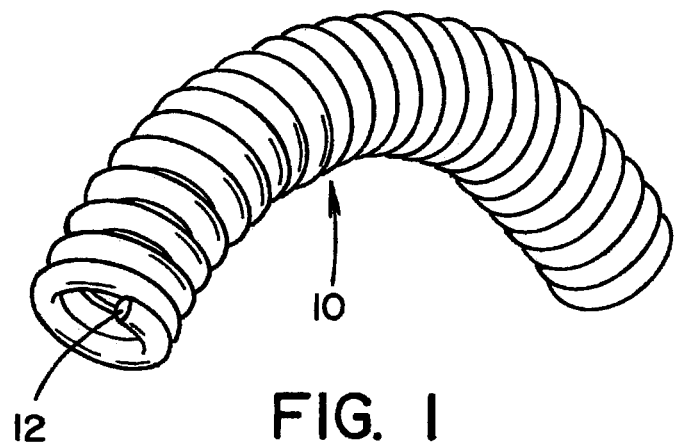
FIG. 1 is an iso view of the arcuate spring in accordance with the present invention.
Figure 2:
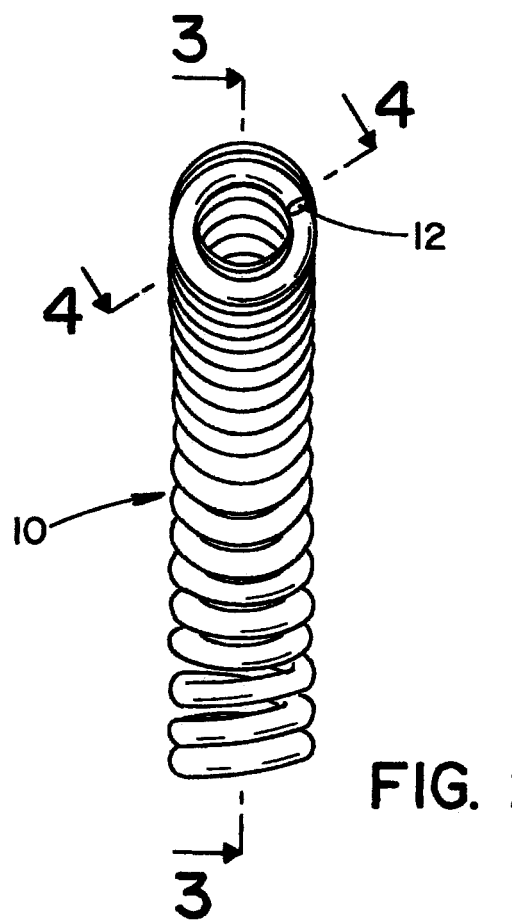
FIG. 2 is a front view of the arcuate spring of FIG. 1.
Figure 3:
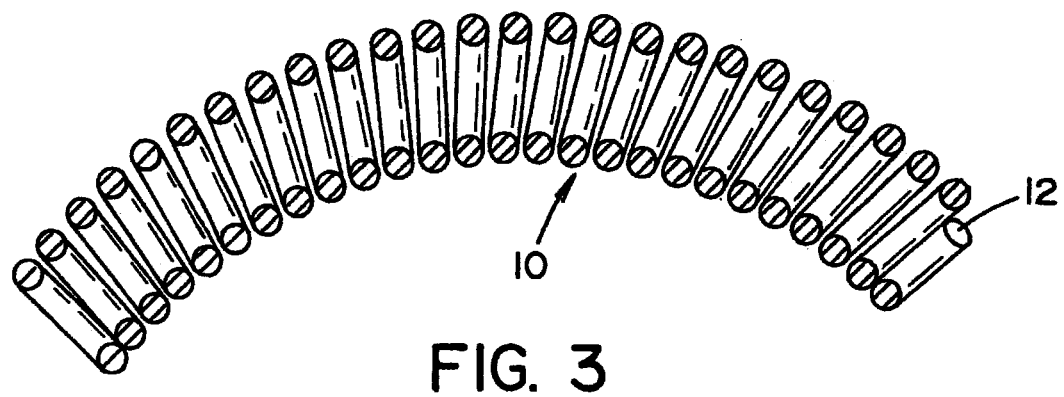
FIG. 3 is a cross-sectional view along lines 3-3 of FIG. 2.
Figure 4:
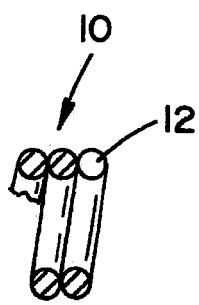
FIG. 4 is a cross-sectional view along lines 4-4 of FIG. 2.

Referring now to FIGS. 1-15, which illustrate non-limiting embodiments of the present invention, there is provided an arcuate spring and method for manufacturing the arcuate spring. The arcuate spring can be used in a variety of different application. One non-limiting application is the use of the arcuate spring in a torsional vibration damper assembly as illustrated in U.S. Pat. No. 5,052,664, which is incorporated herein by reference. The operation of the torsional vibration damper assembly with the arcuate helical spring will be smoother than the operation of a torsional vibration damper assembly which utilizes forcibly bowed straight springs. A forcibly bowed straight spring is constantly experiencing internal stresses which tend to straighten the spring. Thus, the forcibly bowed straight spring rubs against and interferes with the sides of torsional vibration damper assembly, thus inhibiting smooth operation. The arcuate spring when used on a torsional vibration damper assembly will also provide improved attenuation or damping of spring vibrations than the conventional vibration damper which utilizes straight springs for the same reasons as specified above. In addition, the compression of the arcuate spring to a "solid" configuration, i.e., where each coil contacts each adjacent coil, operates as a stop in the system independently of the use of other means. Undesirable stressing in the arcuate helical spring will also be avoided due to the spring's arcuate shape, and by use of induction heating of the spring during the forming process of the spring, thereby improving the efficient use of the vibration damper assembly. A straight spring forcibly bowed upon assembly experiences stresses due to the unnatural installation that are opposite in direction to the stresses which arise in the spring through use in the torsional vibration damper assembly. Springs installed in this manner experience stresses in one direction with the unit at rest. As torque is applied to the unit and increased, the springs deflect until at a point where these stresses diminish to zero. Further loading and deflection results in these stresses increasing in the opposite direction. This bi-directional stressing reduces the stress allowable to avoid excessive relaxation or breakage that can be experienced by the spring in service. In contrast, the body of the arcuate spring will experience only normal uni-directional stressing because the arcuate spring is received in the housing in its natural arcuate state. Thus, the arcuate spring will not be overly stressed, thereby increasing the useful capacity and service life of the vibration damper assembly. The durability of the vibration damper assembly can also be increased due to the reduction in the number of springs required for operation. Spring ends have historically been subject to bending fatigue breakage near the tips of the ground end coils. The present invention avoids the past need to grind the ends of the spring when the novel end caps of the present invention are used. In conventional torsional vibration damper assemblies, a plurality of straight springs are employed, thereby increasing the number of ground ends and providing greater opportunities for failure. However, since a single arcuate spring may replace a plurality of shorter straight springs, the number of spring ends is reduced. Also, those remaining spring ends may be reinforced by making use of the saved space that results from the minimization of components in the damper. Thus, the number of potential failure locations is reduced and the life and durability of the assembly can be increased by use of the arcuate spring.

Figure 12:
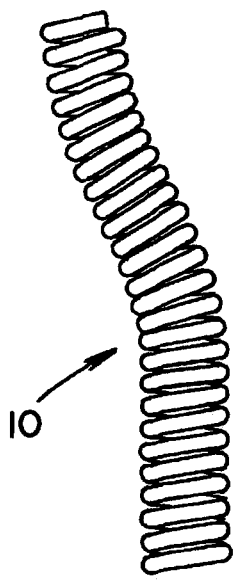
Figure 13:
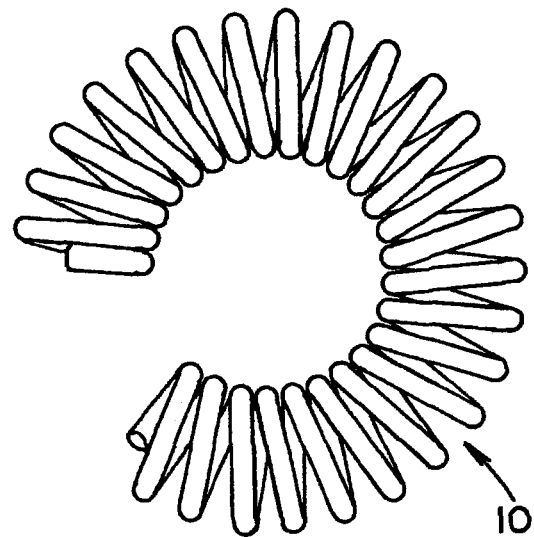
Figure 14:
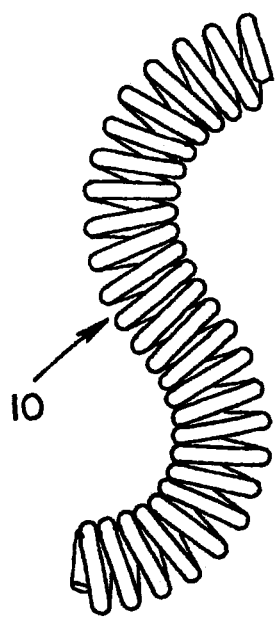
Figure 15:
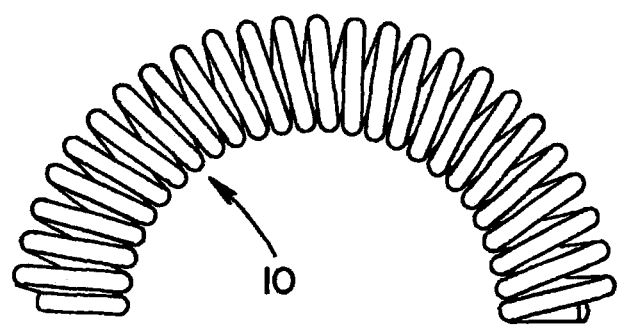

Referring now to FIGS. 1-4 and 8-15, the arcuate spring 10 of the present invention can be made by various processes. FIGS. 1-4 and 15 illustrate an arc shaped spring and FIGS. 8-14 illustrate types of S-shaped springs (FIGS. 8-9 & 14), a C-shaped spring (FIGS. 10 & 13) a U-shaped spring (FIG. 11) and a wave-shaped spring (FIG. 12). The solid lines through the springs illustrated in FIGS. 8-11 are merely is a line along the central axis of the spring to illustrate the shape of the spring and does not represent any type of structure of the spring. As can be appreciated, the spring in accordance with the present invention can have other shapes that include an arcuate shape. In one non-limiting method, a conventionally coiled straight spring is formed by traditional helical spring manufacturing techniques. Such techniques include beginning with annealed or pre-hardened and tempered material of any required cross section. Current materials that can be used include, but are not limited to, 1070, 6150, modified 6150, and 9254 steels, as processed into suitable quality spring wire. Generally, round cross-section, pre-hardened and tempered (Rc 45-55) 6150 steel can be used. As can be appreciated, other materials can be used. As can also be appreciated, the material need not be annealed, pre-hardened and/or tempered. As can further be appreciated, the material can have different Rc values.

After the spring is formed in a straight helical shape, the spring is then heat treated by an induction heating process. For example, in the case of pre-hardened and tempered 6150 steel, the heat treatment by induction heating would be less than about 1 minute and the metal would be heated to at least about 700° F. Any standard induction heating process can be used.

Figure 5:
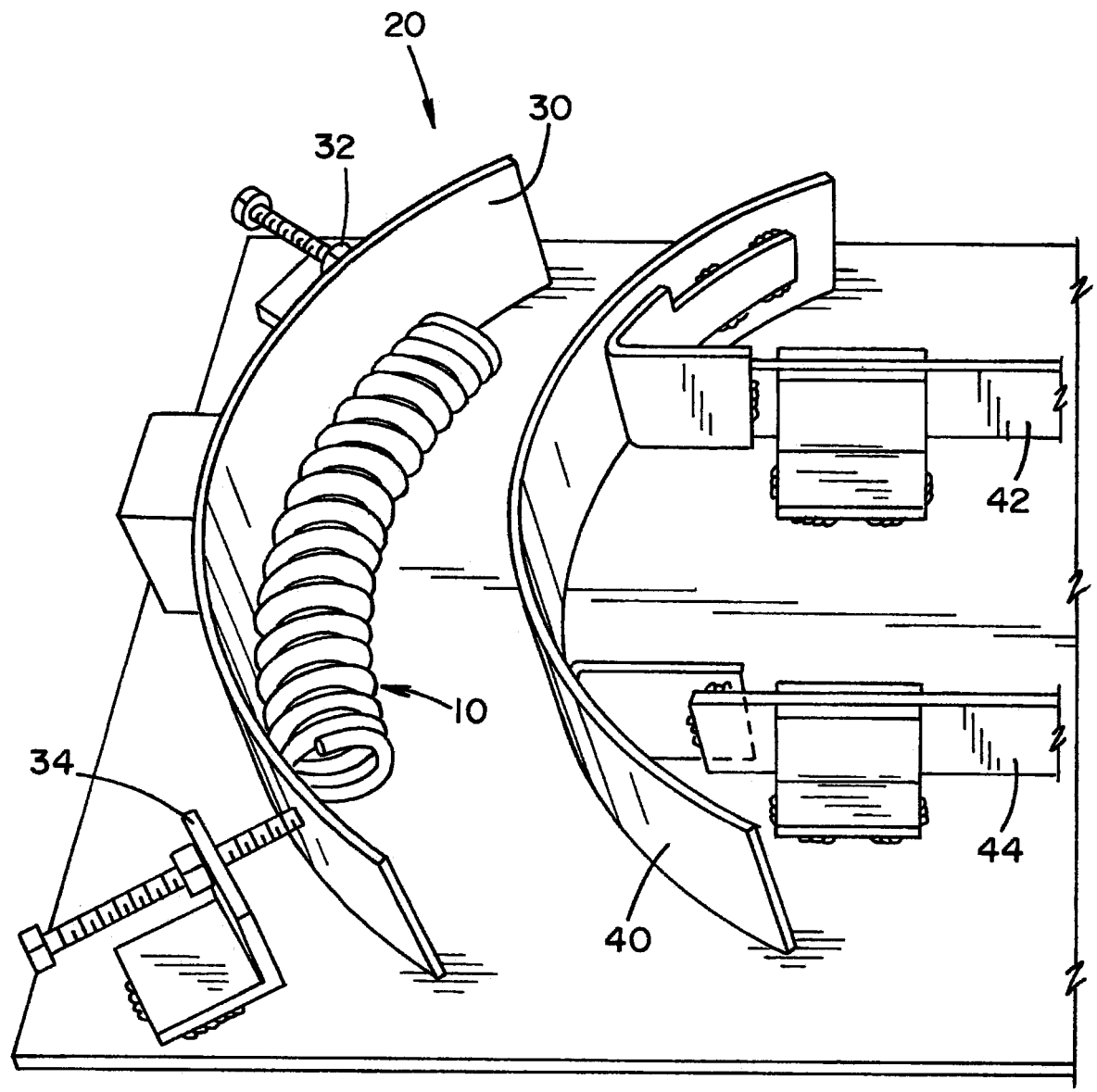
FIG. 5 is a front elevation view of a spring fixture in accordance with the present invention.

After the spring is inductively heated, the straight helical spring is bent and forced into an arc by use of a fixture. Any type of fixture can be used. Generally the fixture is formed of metal material and/or a ceramic material; however, other or additional materials can be used. One non-limiting fixture arrangement is illustrated in FIG. 5. The fixture arrangement 20 includes a clamping arrangement having two arcuate profile surfaces 30, 40 that are positioned on opposite sides of the spring 10. As such, when the two arcuate profile surfaces of the clamping arrangement are drawn together while the straight spring is positioned between the two arcuate profile surfaces, the two arcuate profile surfaces upon contact with the sides of the spring will cause the spring to bend into the desired arcuate shape. The materials used to the form the two arcuate profile surfaces is non-limiting. For example, when an S-shaped spring (See FIGS. 8-9 & 14) is to be formed, the two arcuate profile surfaces can have an S-shape profile. The two arcuate profile surfaces can also have shapes for forming C-shaped spring (See FIGS. 10 & 13), U-shaped springs (See FIG. 11), wave-shaped springs (FIG. 12), etc. Generally the radius of curvature of arcuate profile surface 40 that contacts a first side of the spring is greater than the radius of curvature of the arcuate profile surface 30 that contacts the opposite side of the spring. Arcuate profile surface 30 is illustrated as being mounted in a fixed position by mounts 32, 34; however, this is not required. Arcuate profile surface 40 is illustrated as being moveable by arms 42, 44 between a clamped and unclamped position; however, this is not required. As can be appreciated, either or both arcuate profile surfaces can be designed to be movable. As can be appreciated, the fixture can have other forms. For example, the fixture can include the use of a close-fitting curved rod or pin of a different free angle and arc radius than the desired free angle and arc radius of the finished arcuate spring. This close-fitting curved rod or pin is inserted into the spring. As can be appreciated, other fixtures can be used to cause the spring to be bent into a desired arc prior to the heating process (e.g., bowed or curved tube, die, drum or mandrel about which the spring, etc.).

After the heated spring is formed into the arcuate shaped by the fixture, the heated spring is quenched (e.g., air and/or liquid quench) to a temperature of about ±150° F. of ambient temperature, and typically about ±30° F. of ambient temperature in less than about 3 minutes, typically less than about 2 minutes, and more typically less than about 1 minute; however, other quench times can be used. If the quench fluid is a liquid, the liquid can be water at about ambient temperature; however, other water temperatures can be used. The quenching process generally occurs within about 120 seconds (e.g., ≥60 seconds; ≥30 seconds, etc.) after the spring is formed in the fixture and/or after induction heating process has been completed. The water, when used, can include a soluble oil and/or other type of polymer material; however, this is not required. After the quenching process is completed, the spring is removed from the fixture (e.g., the two arcuate profile surfaces are again separated from one another, rod removed, etc.), at which time the spring retains an arcuate configuration, free or substantially of any internal stresses which would tend to straighten the spring. In one non-limiting process, the step of induction heating is less than about 5 minutes (e.g., 0.1-3 minutes, 0.1-2 minutes, 0.1-1 minute, etc.), the step of bending the heated spring in the fixture is completed in less than about 5 minutes (e.g., 0.01-2 minutes, 0.01-1 minutes, 0.01-0.5 minute, etc.) after the step of induction heating, and the step of quenching the heated spring is completed in less than about 5 minutes (e.g., 0.1-3 minutes, 0.1-2 minutes, 0.1-1 minute, etc.) after the bending said heated spring in said fixture.

Figure 6:
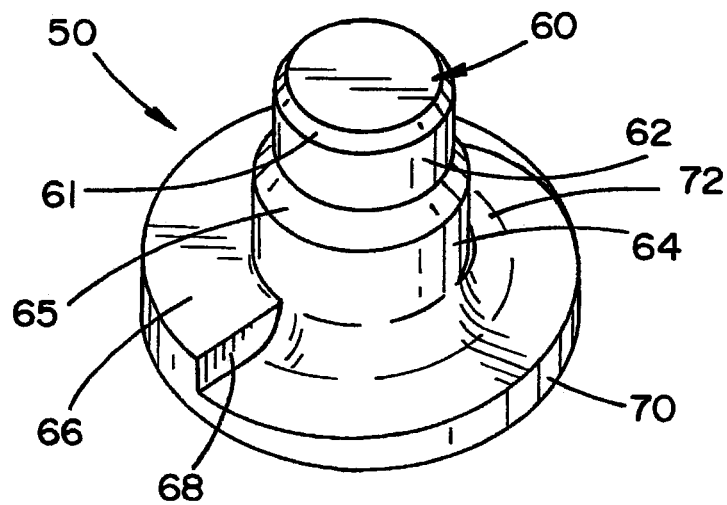
FIG. 6 is a front elevation view of an end cap in accordance with the present invention.
Figure 7:
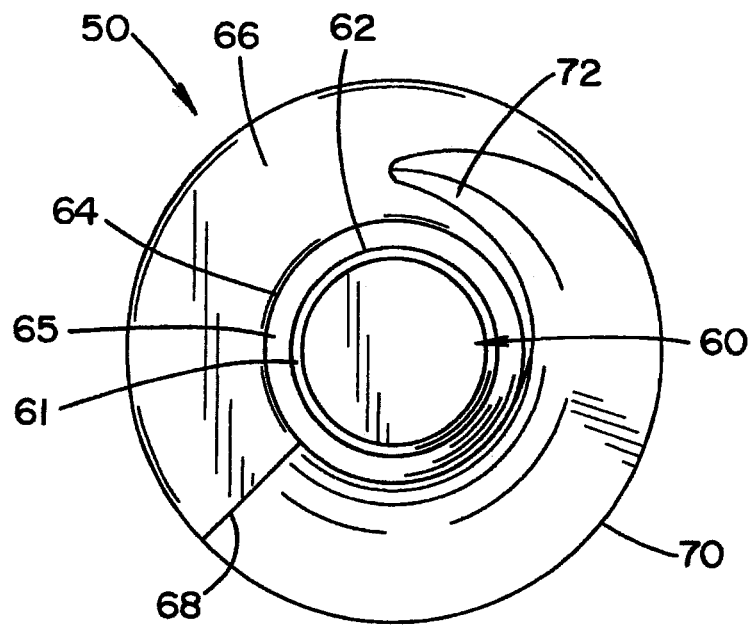
FIG. 7 is a top view of the end cap of FIG. 6.
Figure 8:
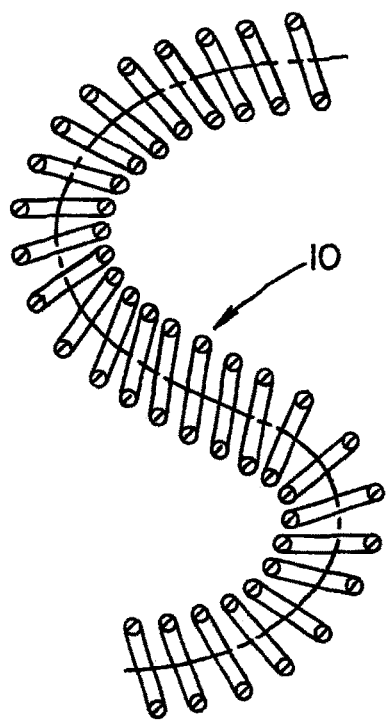
FIGS. 8-15 are side views of several non-limiting arcuate shaped springs in accordance with the present invention.
Figure 9:
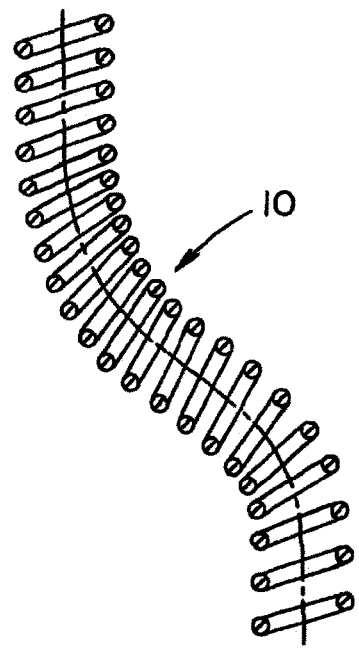
Figure 10:
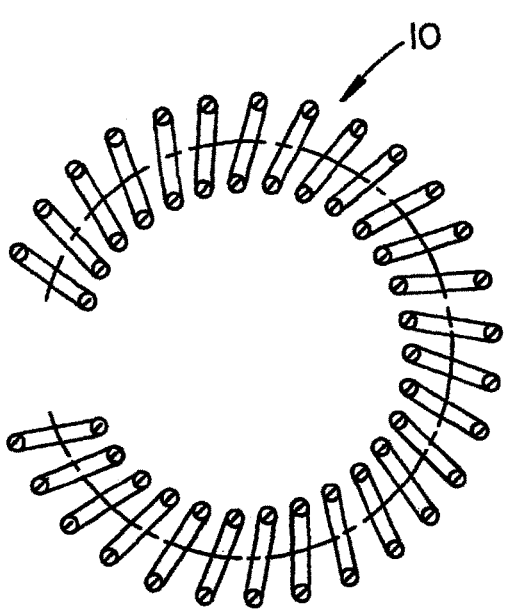
Figure 11:
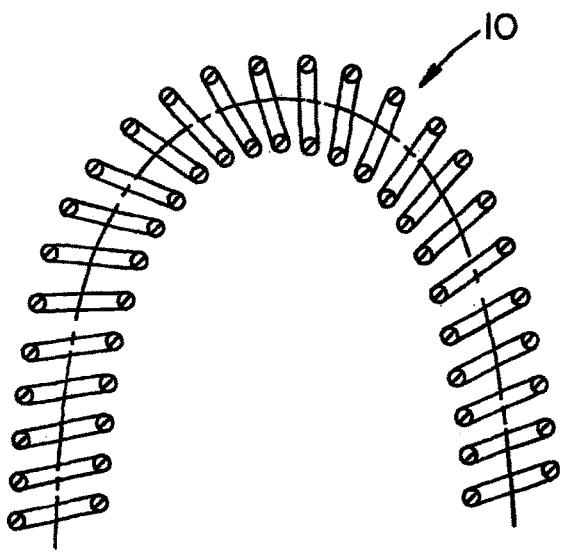

One or more ends of the spring can be optionally ground prior to and/or after the induction heating process; however, this is not required. The grinding step can be eliminated by the use of the end caps 50 as illustrated in FIGS. 6-7. The end cap includes a base portion 70 and a nose 60. The nose is designed to be at least partially inserted into the interior of the spring coils. The base portion has a generally circular cross-sectional shape; however, the base portion can have other shapes. The cross-section size and shape of the base portion is generally selected such that the base portion cannot be fully inserted into the interior of the spring coils; however, this is not required. The thickness of the base portion is non-limiting. The nose portion 60 is illustrated as having a non-uniform cross-sectional size; however, this is not required. The nose portion is illustrated has having a generally circular cross-sectional shape; however, the nose portion can have other shapes. The nose portion has an upper nose portion 62 and a lower nose portion 64; however, this is not required. The top section of the upper nose portion can optionally include a taper 61. The upper nose portion 62 is illustrated as having a smaller cross-sectional size than lower nose portion 64. Generally lower nose portion 64 has a cross-section size and shape such that the lower nose portion 64 engages the inner surfaces of the interior of the spring coils so as to facilitate in secure the end cap to the spring; however, this is not required. A transition 65 can optionally be formed between the upper nose portion 62 and a lower nose portion 64. The transition, when used, can optionally have a tapered or sloped form. The upper surface of the base portion optionally includes a threading lip 72 and/or a stop 68. The threading lip, when used, can have a narrow front portion as illustrated in FIG. 7 which is designed to engage the inner surfaces of the interior of the spring coils so that the end cap can be threaded into the spring; however, this is not required. The stop, when used, is designed to limit the further threading of the end cap onto the spring. As the end cap is threaded onto the spring, the end 12 of the spring will engage the stop and thereby prevent further threading of the end cap into the spring. The threading lip is illustrated as increasing in thickness from the narrow front portion to the stop 68 as illustrated in FIG. 6. The end cap can be formed of any type of material. The end cap, when used, can be used to extend the life of the spring by protecting the ends of the spring. When the ends of the spring are not properly ground, undesired stresses can be applied to the spring ends during use of the spring, thereby cause premature failure of the spring. The use of the end caps on the spring can reduce or eliminate such undesired stresses on the ends of the spring and therefore extend the usable life of the spring.

One or more additional process steps can be used for form the arcuate spring of the present invention. Such optional additional steps include:

i. Stress relieving the formed spring prior and/or after induction heating.

ii. Shot peening the spring one or more times prior and/or after induction heating.

iii. Pre-heating the spring prior to induction heating.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

We claim:

1. An arcuate spring having a longitudinal length, a plurality of spring coils and a central axis that passes through said plurality of spring coils, said spring configured and dimensioned to provide an arcuate shape, at least a portion of said spring includes an arc-shape, a S-shape, a C-shape, a wave-shape or a U-shape, said central axis along said longitudinal length of said spring is a non-straight axis while said spring is in its free state and being substantially free of internal stresses, said spring including first and second ends, said first end including an end cap that is threadedly connected to said first end, said second end including an end cap that is threadedly connected to said second end, each of said end caps including a base portion and a nose, said nose configured to be at least partially inserted into an interior of said spring coils, said base portion having a cross-section size and shape such that said base portion cannot be fully inserted into said interior of said spring coils, said nose and said base portion of said end cap having a generally circular cross-sectional shape, said nose has a non-uniform cross-sectional size along a longitudinal length of said nose, said nose having an upper nose portion and a lower nose portion, said lower nose portion positioned closer to said base portion than said upper nose portion, said lower nose portion connected to said upper nose portion, said upper nose portion having a smaller cross-sectional area than a cross-sectional area of said lower nose portion, said upper nose portion and said lower nose portion each having a longitudinal length, a majority of said longitudinal length of said upper nose portion and a majority of said longitudinal length of said lower nose portion having a constant cross-sectional shape and size, said lower nose portion engaging an inner surface of said spring coils, an upper surface of said base portion includes a threading lip including a front narrow portion and a stop at an end of said threading lip, said threading lip configured to engage said inner surface of said spring coils so that said end cap can be threaded into said spring, said stop configured to limit further threading of said end cap into said spring, said threading lip resulting in said base portion having a non-uniform thickness along a longitudinal length of said base portion, said stop lying in a plane non-parallel to said upper surface of said base portion.

2. The arcuate spring as defined in claim 1, wherein an upper region of said upper nose portion includes a taper, less than a majority of said longitudinal length of said upper nose portion includes said taper, said lower nose portion engaging said inner surface of said spring coils.

3. The arcuate spring as defined in claim 2, wherein said lower nose portion includes a sloped transition, said sloped transition terminating at said upper nose portion, less than a majority of said longitudinal length of said lower nose portion includes said sloped transition.

4. A method for forming an arcuate spring comprising the steps of:
  a. Providing a coiled spring having a longitudinal length, a plurality of spring coils and a central axis that pass through said plurality of spring coils, at least a portion of said spring configured and dimensioned to provide a straight shape along said longitudinal length and said central axis of said spring while said spring is in its free state and being substantially free of internal stresses, said spring including first and second ends;
  b. Heating said spring by induction heating while said straight shape portion of said spring is unbent;
  c. Bending said straight shape portion of said spring while in a heated state in a fixture to form a bent straight portion of said spring, said fixture includes a clamping arrangement having first and second arcuate profile surfaces that are positioned on opposite sides of said heated straight shape portion of said spring, at least one of said first and second arcuate profile surfaces configured to be movable between a clamped and unclamped position, at least one of said first and second arcuate profile surfaces moved to said clamped position to cause said straight shape portion of said spring to bend during said step of bending to form said bent straight portion, a spacing between said first and second arcuate profile surfaces is reduced when at least one of said first and second arcuate profile surfaces are in said clamped position;
  d. Quenching said heated spring in said fixture while at least one of said first and second arcuate profile surfaces are in said clamped position and while said bent straight portion is positioned between said first and second arcuate profile surfaces; and,
  e. Removing said spring from said fixture after said quenching step after at least one of said first and second arcuate profile surface has moved to said unclamped position, said bent straight portion of said spring maintaining said arcuate shape after said spring is quenched and removed from said fixture, said bent straight portion of said spring having said arcuate shape along said longitudinal length of said central axis of said spring when in its free state and said bent straight portion of said spring being substantially free of internal stresses.

5. The method as defined in claim 4, wherein said step of induction heating is less than about 5 minutes, said step of bending said heated spring in said fixture is completed in less than about 5 minutes, said step of bending said heated spring occurring after said step of induction heating is completed, said step of quenching said heated spring is completed in less than about 5 minutes after said bending of said heated spring in said fixture.

6. The method as defined in claim 5, including the step of applying an end cap on at least one end of said spring after said step of quenching, said end cap including a base portion and a nose, said nose configured to be at least partially inserted into an interior of said spring coils, said base portion having a cross-sectional size and shape such that said base portion cannot be fully inserted into said interior of said spring coils.

7. The method as defined in claim 6, wherein an upper surface of said base portion includes a threading lip and a stop, said threading lip configured to engage an inner surface of said spring coils so that said end cap can be threaded into the spring, said stop configured to limit further threading of said end cap into said spring, said threading lip resulting in said base portion having a non-uniform thickness along a longitudinal length of said base portion, said stop lying in a plane non-parallel to a top surface of said base portion, said nose and said base portion of said end cap having a generally circular cross-sectional shape, said nose having a non-uniform cross-sectional size along a longitudinal length of said nose, said nose having an upper nose portion that has a smaller cross-sectional size than a lower nose portion, said lower nose portion positioned closer to said base portion than said upper nose portion, said lower nose portion connected to said upper nose portion, said upper nose portion having a smaller cross-sectional area than a cross-sectional area of said lower nose portion, said upper nose portion and said lower nose portion each having a longitudinal length, a majority of said longitudinal length of said upper nose portion and a majority of said longitudinal length of said lower nose portion having a constant cross-sectional shape and size, said lower nose portion engaging said inner surface of said spring coils.

8. The method as defined in claim 7, wherein at least a portion of said spring includes an arc-shape, a S-shape, a C-shape, a wave-shape or a U-shape.

9. The method as defined in claim 4, including the step of applying an end cap on at least one end of said spring after said step of quenching, said end cap including a base portion and a nose, said nose configured to be at least partially inserted into an interior of said spring coils, said base portion having a cross-sectional size and shape such that said base portion cannot be fully inserted into said interior of said spring coils.

10. The method as defined in claim 9, wherein an upper surface of said base portion includes a threading lip and a stop, said threading lip configured to engage an inner surface of said spring coils so that said end cap can be threaded into the spring, said stop configured to limit further threading of said end cap into said spring, said threading lip resulting in said base portion having a non-uniform thickness along a longitudinal length of said base portion, said stop lying in a plane non-parallel to a top surface of said base portion, said nose and said base portion of said end cap having a generally circular cross-sectional shape, said nose having a non-uniform cross-sectional size along a longitudinal length of said nose, said nose having an upper nose portion that has a smaller cross-sectional size than a lower nose portion, said lower nose portion positioned closer to said base portion than said upper nose portion, said lower nose portion connected to said upper nose portion, said upper nose portion having a smaller cross-sectional area than a cross-sectional area of said lower nose portion, said upper nose portion and said lower nose portion each having a longitudinal length, a majority of said longitudinal length of said upper nose portion and a majority of said longitudinal length of said lower nose portion having a constant cross-sectional shape and size, said lower nose portion engaging said inner surface of said spring coils.

11. The method as defined in claim 4, wherein at least a portion of said spring includes an arc-shape, a S-shape, a C-shape, a wave-shape or a U-shape.

12. A method for forming an arcuate spring comprising the steps of:
   a. providing a coiled wire spring, said spring having a longitudinal length, a plurality of spring coils and a central axis along said longitudinal length of said spring, said central axis passes through said plurality of spring coils of said spring, at least a portion of said spring configured and dimensioned to have a straight shape along said longitudinal length and said central axis of said spring while said spring is in its free state and being substantially free of internal stresses, said spring including first and second ends;
   b. heating said spring by induction heating while said straight shape portion of said spring is unbent, said step of induction heating is less than about 5 minutes;
   c. positioning said straight shape portion of said spring in a fixture while said spring is in a heated state after being heated by said induction heating, said fixture including a clamping arrangement having first and second arcuate profile surfaces that are positioned on opposite sides of said heated spring, at least one of said first and second arcuate profile surfaces configured to be movable between a clamped and unclamped position;
   d. bending said straight shape portion of said spring while said heated spring is in a heated state in said fixture by moving at least one of said first and second arcuate profile surfaces from said unclamped position to said clamped position thereby causing a distance between said first and second arcuate profile surfaces to reduce and thereby causing said straight shape portion of said spring to engage said arcuate profile surfaces and thereby causing said straight shape portion of said spring to engage said arcuate profile surfaces and to bend to form a bent straight portion, said bent straight shape portion being caused to conform to a shape of a space between said first and second arcuate profile surfaces when at least one of said first and second arcuate profile surfaces is in said clamped position, said straight shape portion of said spring being inserted into said fixture and being bent in said fixture after completion of said induction heating step, at least a portion of said shape of said space between said first and second arcuate profile surfaces when at least one of said first and second arcuate profile surfaces is in said clamped position is selected from the group consisting of an arc-shape, a S-shape, a C-shape, a wave-shape or U-shape, said bent straight shape portion of said spring having a non-linear shape along said longitudinal length and said central axis of said spring;
   e. quenching said heated spring in said fixture while at least one of said first and second arcuate profile surfaces are in said clamped position and while said bent straight shaped portion of said spring is positioned between said first and second arcuate profile surfaces, said step of quenching said heated spring is completed in less than about 5 minutes;
   f. moving at least one of said first and second arcuate profile surfaces to said unclamped position after said spring is quenched; and,
   g. removing said spring from said fixture after said quenching step and after at least one of said first and second arcuate profile surfaces are moved to said unclamped position, said bent straight shaped portion of said spring maintaining said arcuate shape along said longitudinal length and said central axis of said spring after said spring is quenched and removed from said fixture, said bent straight shaped portion of said spring having said arcuate shape along said longitudinal length and said central axis of said spring when in its free state and said bent straight shaped portion of said spring being substantially free of internal stresses, at least a portion of said bent straight shaped portion of said spring having a shape after being subjected to said heating and quenching steps that is selected from the group consisting of an arc-shape, a S-shape, a C-shape, a wave-shape or U-shape.

13. The method as defined in claim 12, including the step of threadedly applying an end cap on at least one end of said spring after said step of quenching, said end cap including a base portion and a nose, said nose configured to be at least partially inserted into an interior of said spring coils, said base portion having a cross-section size and shape such that said base portion cannot be fully inserted into said interior of said spring coils, an upper surface of said base portion includes a threading lip and a stop, said threading lip configured to engage an inner surface of said spring coils so that said end cap can be threaded into the spring, said stop configured to limit further threading of said end cap into said spring, said threading lip resulting in said base portion having a non-uniform thickness along a longitudinal length of said base portion, said stop lying in a plane non-parallel to a top surface of said base portion.

14. The method as defined in claim 13, wherein an upper region of said upper nose portion includes a taper, said upper nose portion and said lower nose portion each having a longitudinal length, less than a majority of said longitudinal length of said upper nose portion includes said taper, and wherein said lower nose portion includes a sloped transition, said sloped transition terminating at said upper nose portion, less than a majority of said longitudinal length of said lower nose portion includes said sloped transition, and wherein a majority of said longitudinal length of said upper nose portion and a majority of said longitudinal length of said lower nose portion having a constant cross-sectional shape and size, said lower nose portion positioned closer to said base portion than said upper nose portion, said upper nose portion having a smaller cross-sectional area than a cross-sectional area of said lower nose portion, said lower nose portion engaging said inner surface of said spring coils.

* * * * *